United States Patent Office 3,275,237
Patented Sept. 27, 1966

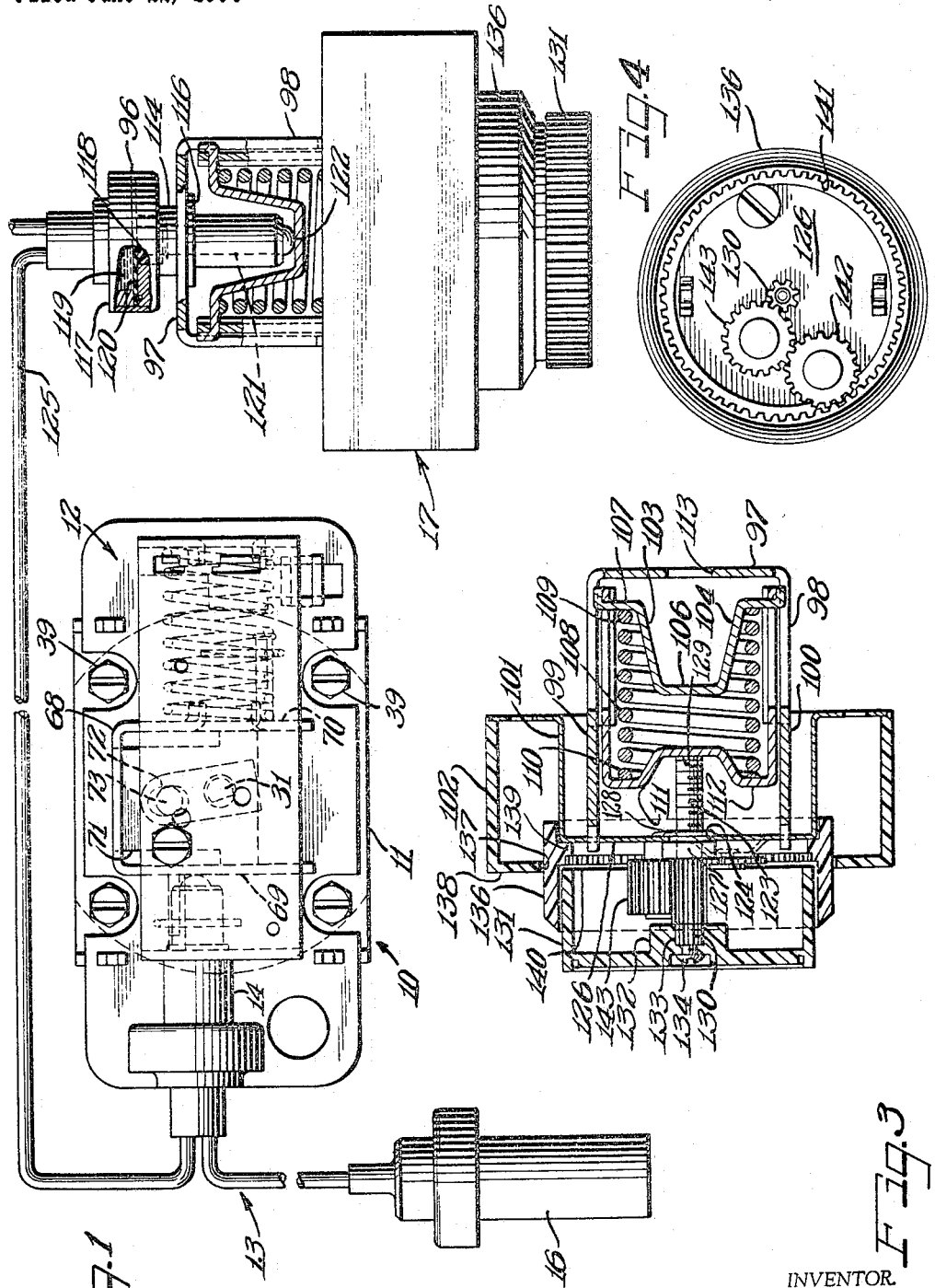

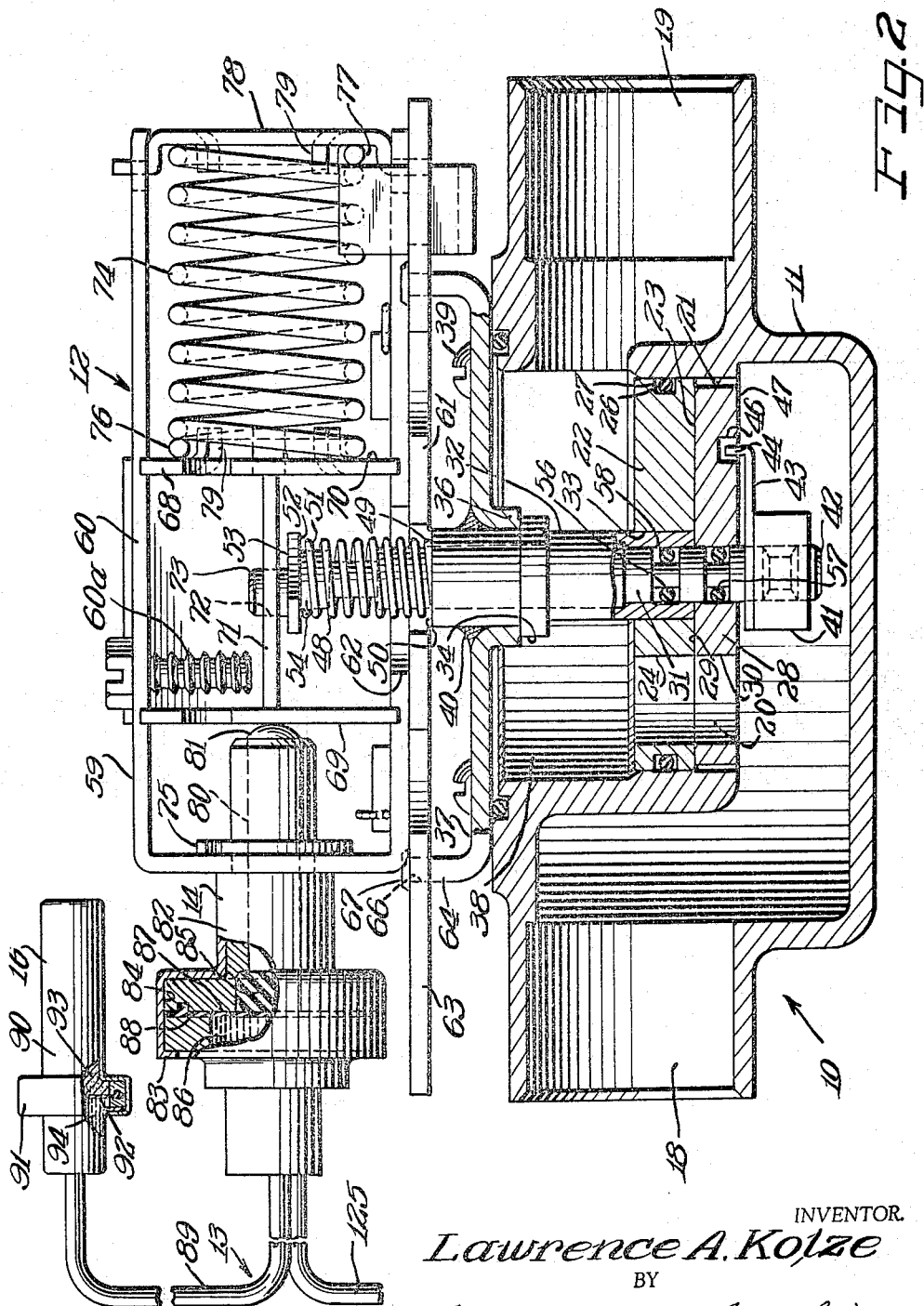

3,275,237
ROTARY SHEAR VALVE WITH
REMOTE CONTROL
Lawrence A. Kolze, Bensenville, Ill., assignor to The Dole
Valve Company, Morton Grove, Ill., a corporation of
Illinois
Filed June 22, 1964, Ser. No. 376,811
5 Claims. (Cl. 236—51)

This invention relates generally to fluid control valves and more particularly relates to a rotary valve which is particularly suited for use in a liquid heating or cooling system and which comprises both a remote temperature sensitive valve actuator and a remote manually adjustable valve actuator for controlling fluid flow through the valve.

Fluid flow control valves are commonly employed in liquid heating and cooling systems whereby the temperature of the conditioned space is controlled by regulating the flow of the liquid heating or cooling medium through heat transfer apparatus such as convectors or coils situated within or connected to the conditioned space. The flow rate of the liquid medium required to maintain a predetermined temperature in the conditioned space is generally controlled by means of a fluid flow control valve connected to the heat transfer apparatus and is a function of, among other things, the temperature of the liquid medium as well as the capacity of the heat transfer apparatus employed in the system.

Operation of the flow control valve may be controlled by an actuator connected to the valve which senses and responds to temperature, for example, the temperature of the conditioned space. However, if the valve actuator is situated closely adjacent the valve and the heat transfer apparatus connected thereto, the temperature ambient the actuator will not correspond to the temperature of the conditioned space, but will instead be subjected to the exaggerated temperature immediately adjacent the heat transfer apparatus.

In accordance with the principles of the present invention, a temperature sensitive valve actuator is provided with means for remote positioning, thereby avoiding the possibly extreme ambient temperature of the valve itself. The temperature sensitive actuator of this invention is self-contained, and includes a fluid control circuit for actuating the valve, thereby precluding the necessity of using electric energy as a source of power for the valve.

The valving mechanism of the invention is of the rotary type, the operation of which is relatively insensitive to the pressure of the fluid controlled by the valve. A valve operating assembly is mounted on the valve body and comprises a linearly movable force transmitting member connected in fluid communication to the temperature sensitive valve actuator and suitable linkage apparatus for translating said linear movement to rotary movement for operating the valving mechanism.

In addition, the invention contemplates a manually adjustable remotely positioned valve actuator including a fluid control circuit connected to the valve operating assembly in parallel with the fluid control circuit of the temperature sensitive actuator and serves to vary the influence or effect of the temperature sensitive actuator on the fluid control valve in accordance with the manual adjustment thereof. Thus, the setting of the fluid flow control valve can be controlled for any given temperature ambient the "automatic" temperature sensitive valve actuator by means of adjustment of the manually adjustable valve which can be accomplished, for example, by occupant of the conditioned space.

It is, therefore, an object of the present invention to provide a fluid flow control valve having a remotely positioned self-contained temperature sensitive actuator connected thereto for controlling the setting of the valve in response to temperature ambient the actuator.

It is another object of the present invention to provide a fluid control valve remotely controlled by means of a temperature sensitive actuator with a remotely situated manually adjustable actuator for regulating the effect of the temperature sensitive actuator on the valve.

And yet another object of the present invention is to provide a rotary type fluid flow control valve which is relatively insensitive to the pressure of the controlled fluid and a pair of remotely situated valve actuators for controlling the valve, one of said actuators being of the temperature sensitive type and responsive to temperature surrounding the actuator and the other of said actuators being of the manually adjustable type for manually regulating the effect of the temperature sensitive actuator on the valve.

A still further object of the present invention is to provide a fluid control valve incorporating a rotary type valve mechanism and a valve operating assembly mounted on the valve for controlling the operation thereof and comprising a linearly movable force transmitting member and suitable linkage apparatus for translating said linear movement to rotary movement to operate the rotary valve mechanism.

Another object of the present invention is to provide a mechanically operated manually adjustable actuator for use with a fluid control valve and comprising a fluid control circuit incorporating a spring biased piston-diaphragm assembly for pressurizing the fluid control circuit and manually adjustable means for varying the biasing effect of said spring.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

On the dawings:

FIGURE 1 is a top plan view of a fluid flow control valve including a remotely situated temperature sensitive actuator and a manually adjustable actuator connected thereto and constructed in accordance with the principles of the present invention;

FIGURE 2 is a vertical sectional view of the control valve of FIGURE 1 with parts shown in elevation;

FIGURE 3 is a side elevational view of the manually adjustable actuator shown in FIGURE 1; and FIGURE 4 is an end elevational view of the actuator of FIGURE 3 with portions thereof removed to illustrate the relative positioning of parts.

As shown on the drawings:

Although the principles of the present invention are of utility in any fluid flow control valve, a particularly useful application is made to a fluid control valve particularly suited for use in liquid heating or cooling systems and an illustrative embodiment herein shown consists of a rotary type valve indicated generally at reference numeral 10 in FIGURE 1 and having a valve body 11 and a valve operating or force transmitting assembly mounted thereon as at 12.

The valve operating assembly 12 operates the valve 10 in response to variations in fluid pressure in a fluid control circuit 13 which is filled with a non-compressible liquid which acts on a pressure sensitive force transmitting member 14. The fluid pressure in the circuit 13 is a function of the temperature surrounding a remotely situated temperature sensitive actuator 16 connected in fluid communication to the circuit 13. Variations in temperature ambient the actuator 16 thereby affect the pressure of the fluid in the circuit 13 which, in turn, controls the operation of the fluid control valve 10 through the operating assembly 12.

In order to vary the effect of the actuator 16 on the valve 10, a manually adjustable remotely-situated actuator 17 is also connected in fluid communication to the force transmitting member or power unit 14 by means of the fluid control circuit 13 and in parallel with the temperature sensitive actuator 16.

It will be noted that the temperature sensitive actuator 16 which may conveniently be situated within the conditioned space or zone, the temperature of which is controlled by the valve 10, is a sealed unit having no provision for adjustment and responds solely to variations in temperature ambient the actuator. The actuator 17, on the other hand, which may also be situated within the conditioned space and operated by the occupant thereof, is substantially insensitive to variations in temperature and operates solely through manual adjustment thereof. As will be apparent hereinafter, however, adjustment of the actuator 17 varies the effect or influence of the actuator 16 on the power unit 14 and thereby provides for regulation of the valve 10 and the temperature of the conditioned space, preferably by the occupant thereof.

Referring to FIGURE 2, the valve body 11 includes an inlet passage 18, an outlet passage 19 and a flow passage 20 interconnecting and extending transversely to the inlet and outlet passages and formed by a cylindrical inner wall 21.

Situated within the flow passage 20 and confined therein by suitable means such as a press-fit connection is an annular or disc-shaped valve seating member 22 having a flat radially extending valve seating surface formed thereon as at 23 and having extending therethrough in axially offset relation a cylindrical aperture 24. It will be observed that an O ring 26 is situated within a groove 27 formed in the periphery of the valve seating member 22 for sealing engagement with the inner wall 21.

A complementarily shaped rotary valve member 28 is positioned adjacent the valve seating member 22 and comprises a seating surface 29 in abutting engagement with the seating surface 23 of the seating member 22. The valve member 28 is rotatable within the flow passage 20 and has formed therein an aperture 30 alignable with the aperture 24 of the seating member 22 when the valve member 28 is in a predetermined angular position for establishing a flow path between the inlet 18 and the outlet 19.

In order to provide rotary movement to the valve member 28 for controlling fluid flow through aperture 30, an axially extending valve stem 31 is securely fastened thereto by suitable means such as a press-fit connection. The valve stem 31 is journalled for rotation in a valve stem sleeve member 32 which extends through an aperture 33 formed in the seating member 22.

In order to prevent the sleeve 32 from traveling axially outwardly relative to the valve body 11, a shoulder portion 34 is formed thereon for abutting an inturned flange portion 36 of a cover plate member 37 which encloses an internal chamber 38 formed within the valve body 11. The cover plate 37 is connected in fixed assembly to the valve body 11 by a plurality of fasteners as at 39 which extend through the plate and into the valve body. The plate 37 is also fixedly secured to the sleeve 32 by means of a welded joint as at 40.

In order to maintain abutting engagement of the valve member 28 against the seating member 22, and to provide for corotation of the valve member and the valve stem 31, an enlarged diameter head cap 41 is fixedly secured for corotation to an end portion 42 of the valve stem 31 and comprises a radially extending finger member 43 having a tang 44 projecting into a socket or detent 46 formed in a back face 47 of the valve member 28. The cap 41 is urged into abutting engagement with the valve member 28 by means of a biasing member acting on the valve stem 31 and which may conveniently take the form of a coil spring 48 abutting at one end 49 thereof against an end surface 50 of the sleeve 32 and abutting at an opposite end 51 thereof against a shoulder or retainer flange 52 of a crank arm 53 extending laterally or radially from a top end portion 54 of the valve stem 31. The spring 48 is selected to provide sufficient biasing force between the valve member 28 and the seating member 22 to prevent leakage past the interfacing seating surfaces thereof.

It will be observed that a pair of circumferential grooves as at 56 and 57 are formed in the lower portion of the valve stem 31 and confine respectively a pair of O rings as at 58 for preventing leakage through the sleeve 32 past the valve stem.

Referring to FIGURES 1 and 2, the valve operating assembly 12 is particularly characterized as comprising a frame 59 having a pair of leg members 60 and 61 extending transversely to the valve stem 31. The leg member 61 is apertured as at 62 for receiving the valve stem and the coil spring 48, and is connected in fixed assembly to a mounting bracket 63 which is, in turn, fixedly connected to the cover plate 37 by means of a plurality of upturned extensions of the plate as at 64 which extend through passages as at 66 formed in the mounting bracket and flattened down to form a retainer head as at 67.

In order to provide rotary movement to the valve stem 31, a pin guide member 68 is confined between the leg members 60 and 61 of the frame 59 for slidable linear or translatory movement relative to the leg members and in a direction transverse to the axis of the valve stem 31. The pin guide member 68 includes a pair of spaced parallel motive plates 69 and 70 which extend parallel to the axis of the valve stem and a pin drive plate 71 connected to the motive plate 69 and 70 and having formed therein an elongated slot 72 for receiving a crank pin 73 projecting axially outwardly from the crank arm 53 in axially offset relation to the valve stem 31.

It will be apparent that linear movement of the pin guide member 68 between the leg members 60 and 61 in a direction transverse to the axis of the valve stem 31 will be translated into rotary movement of the valve stem 31 by means of the crank pin 73 riding in the slot 72 formed in the pin drive plate 71. It will be observed that a stop member 60a is provided to prevent overtravel of the pin guide member 68.

The pin guide member 68 is normally biased in one direction, that is, leftwardly as viewed in FIGURES 1 and 2, by means of a biasing member which in the illustrated embodiment comprises a coil spring 74 having one end 76 thereof abuttingly engaging the motive plate 70 and restrained at its opposite end 77 by means of a retraining member 78 connected at opposite ends to the leg members 60 and 61. The coil spring 74 is maintained in suitable position relative to the motive plate 70 and the retaining member 78 by means of axially inturned prongs as at 79 which confine the coils of the spring against radial movement thereof.

In order to provide rightward movement of the guide member 78 as viewed in the drawing, the power unit 14 is securely mounted on the frame 59 by means of a lock ring 75 and comprises a cylindrical elongated plunger or piston member 80 which is slidably carried within a body portion 82 of the power unit 14 and extensible on an axis transverse to the axis of the valve stem 31. The piston 80 has a head portion 81 abuttingly engageable with the motive plate 69.

The force transmitting member or power unit 14 is more particularly characterized as comprising an enlarged diameter portion 83 formed in the body portion 82 and providing a chamber 84 which is divided into a pair of smaller chambers 86 and 87 by a flexible diaphragm member 88.

A rubber plug 85 is positioned within the chamber 87 between the diaphragm 88 and the piston 80 for transmitting movement therebetween, and the chamber 86 is filled with the noncompressible liquid which fills the fluid control circuit 13 and is connected in fluid communication therewith by means of a conduit 89.

Referring particularly to FIGURE 2, the temperature sensitive actuator 16 is of a type well known in the art and comprises a body member 90 having an enlarged portion 91 which forms a large internal chamber which is divided into a pair of smaller chambers 93 and 94 by means of a flexible diaphragm 92. The chamber 93 contains material which is expansible under temperature increase and chamber 94 contains the same noncompressible liquid which fills the fluid control circuit 13, and is in fluid communication therewith.

It will now be appreciated that an increase in the temperature ambient the temperature sensitive actuator 16 will cause the expansible material in chamber 93 thereof expand, thereby flexing the diaphragm 92 and increasing the pressure of the liquid in chamber 94, thereby increasing the pressure in the chamber 86 of the power unit 14 and flexing the diaphragm 88 thereof against the piston 80 to urge the pin guide member 68 in the direction of the coil spring 74, with corresponding simultaneous rotation of the valve stem 31 in one direction. A reduction in temperature ambient the actuator 16 has the effect of rotating the valve stem 31 in an opposite direction.

In order to vary the pressure of the fluid in the hydraulic circuit 13 independently of the temperature surrounding the actuator 16, the manually adjustable actuator 17 (FIGURES 1 and 3) comprises a power unit 96 which is similar to the power unit 14 and which is securely fastened by means of a lock ring 116 to a bight portion 97 of a generally U-shaped mounting frame member as at 98.

The frame member 98 is particularly characterized as including a pair of elongated spaced parallel leg members 99 and 100 fixedly secured by suitable means to a flange member 101 of a body member 102 of the actuator 17. Slidably mounted for relative axial movement on the leg members 99 and 100 is a cup-shaped stirrup 103 comprising a converging side wall 104, a back wall 106 and a radially extending peripheral flange portion 107.

The stirrup 103 is biased in the direction of the bight portion 97 by means of a coil spring 108 having one end thereof as at 109 seated on the flange 107 of the stirrup, and an opposite end 110 thereof seated on a back plate 111 of an inverted generally U-shaped retainer member 112 which is mounted for relative axial movement on the stirrup 103.

The bight portion 97 of the U-frame 98 is apertured as at 113 to receive a body portion 114 of the power unit 96 which comprises an enlarged portion 117 forming an internal chamber which is divided into two smaller chambers 118 and 119 by means of a flexible diaphragm 120. An elongated cylindrical piston 121 is slidably extensibly journalled within the body portion 114 and a head portion 122 thereof is positioned to abut the diaphragm 120 within the chamber 118, which may be open to atmosphere.

In order to vary the biasing effect of the spring 108 on the stirrup 103 and, in turn, the piston 121, a threaded stud 123 extends through an aperture 124 formed in an end wall 126 of the flange member 101 and is threadedly received in a complementarily threaded nut 127 securely fastened to the wall 126 by means of a lock ring 128.

One end 129 of the stud 123 abuts the back plate 111 and it will be apparent that rotation of the stud 123 will tend to vary the axial spacing between the back plate 111 and the stirrup 103 and will thereby vary the biasing effect of the spring 108 on the stirrup 103 and, in turn, the piston 121.

A plurality of gear teeth are formed at an end portion 130 of the stud 123, and in order to facilitate rotation of the stud a manually adjustable knob 131 is fixedly secured thereto for corotation therewith and comprises an embossment 132 having an aperture 133 shaped to snugly receive portions of the gear teeth of the stud 123 for tight engagement therebetween. A suitable fastener 134 is provided for maintaining the knob 131 and the stud 123 in assembled relation.

Since adjustment of the manual actuator 17 effects the pressure in the fluid control circuit 13 and thereby regulates the flow of liquid heating or cooling medium through the valve 10 for any given temperature ambient the automatic actuator 16, the actuator 17 in effect controls the temperature of the conditioned space. In order to provide for visual indication of the setting of the actuator 17, a cylindrical collar member 136 is adapted to rotate as a function of rotation of the knob 131, and is received in a circular aperture 137 formed in a front wall 138 of the actuator body 102 and surrounds the adjustment knob 131.

The collar 136 is more particularly characterized as providing a radially inwardly projecting annular flange 139 which is confined between the end wall 126 of the flange member 101 and a rear wall 140 of the adjustment knob 131.

As best seen in FIGURE 4, the inner periphery of the flange 139 has formed thereon a plurality of gear teeth 141 extending circumferentially therearound and are connected in mating relation with the gear portion 130 of the stud 123 by means of a pair of intermediate gears 142 and 143 journalled for rotation on the end wall 126 of the flange member 101. Due to the relative diameters of the various gears, it is apparent that for a given angle of rotation of the knob 131, the collar 136 will have an angle of rotation proportionately less. Suitable indicia, such as "warmer" and "colder" may be formed on either or both the knob 131 and the collar 136 for providing visual indication of the setting of the actuator 17.

Although minor modifications might be suggested by those versed in the art, it should be understood that I wish to embody within the scope of the patent warranted hereon all such modifications as reasonably come within the scope of my contribution to the art.

I claim as my invention:

1. A manually adjustable actuator for remotely actuating a fluid pressure responsive control value having a fluid-filled conduit operatively connected thereto and comprising, an actuator body having a chamber formed therein and a movable diaphragm dividing said chamber into two separate chambers, means forming connecting means on one of said chambers for connecting said one chamber in fluid communication to said conduit, a piston member movably mounted on said actuator body and having a first portion extending into the other of said separate chambers for moving said diaphragm in response to movement thereof and a second portion extending out of the other of said separate chambers, a U-shaped mounting frame having a bight portion thereof fixedly connected to said actuator body and a pair of spaced parallel elongated leg portions extending substantially parallel to said piston member on both sides thereof, a stirrup member mounted on said leg portions of said mounting frame and axially movable relative thereto, a U-shaped retainer member arranged inwardly to said mounting frame and having a bight portion opposite the bight portion of said mounting frame and a pair of spaced parallel elongated leg portions mounted on said stirrup member and axially movable relative thereto, resilient biasing means confined between said bight portion of said retainer member and said stirrup for urging said stirrup toward said piston, a threaded stud member carried by said mounting frame and axially movable relative to and engageable with said retainer member for axially moving said retainer member to vary the biasing force of said biasing means, a manual adjustment knob mounted on said stud.

2. The manually adjustable actuator of claim 1 and including indicia means mounted on said actuator body and rotatable in response to rotation of said adjustment knob for visually indicating the setting of said actuator.

3. A fluid control valve comprising, a valve body having an inlet, an outlet and a passage communicating said inlet and said outlet, a valve seating member in said passage having an aperture formed therein for establishing flow through said passage, a valve member situated in said passage adjacent said seating member and rotatable relative thereto for closing said aperture, an elongated valve stem rotatably mounted on said valve body, said stem having a first portion extending into said passage and being fixedly connected to said valve member for corotation therewith and having a second portion extending outwardly of said valve body, a radially extending crank arm fixedly connected to said second portion of said valve stem and having an axially extending pin member formed thereon in axial offset relation with respect to said valve stem, a force transmitting assembly mounted on said valve body and comprising, an assembly frame fixedly connected to said valve body and having a pair of spaced substantially parallel leg members extending transversely to said valve stem, said frame having an aperture formed therein for receiving said valve stem to position said second portion of said valve stem and said crank arm between said leg members, a pin guide member slidably mounted for translatory movement on said frame between said leg members and engaging said pin member for imparting rotatable movement to said valve member in response to translatory movement thereof, biasing means including a coil spring connected to said frame and engaging said guide member for urging said guide member in one direction, and force transmitting means mounted on said frame for urging said guide member in an opposite direction, temperature sensitive actuating means remote from said valve body and connected to said force transmitting means for actuating said force transmitting means in response to temperature ambient said temperature sensitive means, and manually adjustable actuating means remote from said valve body and connected to said force transmitting means for actuating said force transmitting means independent of said temperature sensitive actuating means in response to manual adjustment thereof.

4. A fluid control valve comprising, a valve body having an inlet, an outlet and a cylindrical passage communicating said inlet and said outlet, a valve seating member in said passage having a seating surface disposed substantially transversely to said passage, an aperture formed axially in said seating member for establishing flow through said passage, a valve member situated in said passage adjacent said seating member and having a complemental seating surface in slidable abutting engagement with said seating surface of said seating member, said valve member being rotatable relative to said seating member for closing said aperture to discontinue flow through said passage, an elongated valve stem rotatably mounted on said valve body and having a first portion extending into said passage and fixedly connected to said valve member for corotation therewith and having a second portion extending outwardly of said valve body, a shoulder formed on said second portion of said valve stem in spaced relation to said valve body, a coil spring surrounding said second portion of said valve stem and interposed between said shoulder and said valve body for imparting an outward bias to said valve stem for maintaining the seating surfaces of said valve member and said seating member in leak-proof abutting relation, a radially extending crank arm fixedly connected to said second portion of said valve stem and having an axially extending pin member formed thereon in axial offset relation with respect to said valve stem, a force transmitting assembly mounted on said valve body and comprising, an assembly frame fixedly connected to said valve body, a pin guide member slidably mounted on said frame for translatory movement thereof and engaging said pin member for imparting rotatable movement to said valve member in response to translatory movement of said guide member, biasing means for urging said guide member in one direction, and force transmitting means mounted on said frame for urging said guide member in an opposite direction, temperature sensitive actuating means remote from said valve member and connected to said force transmitting means for actuating said force transmitting means in response to temperature ambient said temperature sensitive means, and manually adjustable actuating means remote from said valve body and connected to said force transmitting means for actuating said force transmitting means independent of said temperature sensitive actuating means in response to manual adjustment thereof.

5. A fluid flow control valve comprising, a valve body having an inlet, an outlet and a passage communicating said inlet and said outlet, a rotatable valve member and a valve seat in said passage for controlling fluid flow therethrough, an elongated valve stem rotatably mounted on said valve body, said stem having a first portion extending into said passage and being fixedly connected to said valve member for corotation therewith and having a second portion extending outwardly of said valve body, a radially extending crank arm fixedly connected to said second portion of said valve stem and having an axially extending pin member formed thereon in axial offset relation with respect to said valve stem, a force transmitting assembly mounted on said valve body and comprising, an assembly frame fixedly connected to said valve body, a pin guide member slidably mounted for translatory movement on said frame and engaging said pin member for imparting rotatable movement to said valve member in response to translatory movement thereof, biasing means connected to said frame and said guide member for urging said guide member in one direction, and force transmitting means mounted on said frame for urging said guide member in an opposite direction, temperature sensitive actuating means remote from said valve body, a first fluid-filled conduit interconnecting said temperature sensitive actuating means and said force transmitting means for actuating said force transmitting means in response to temperature ambient said temperature sensitive means, manually adjustable actuating means remote from said valve body, and a second fluid-filled conduit connecting said manually adjustable actuating means and said force transmitting means in parallel with said first conduit for actuating said force transmitting means independent of said temperature sensitive actuating means and in response to manual adjustment thereof.

References Cited by the Examiner

UNITED STATES PATENTS

| | | | |
|---|---|---|---|
| 1,925,530 | 9/1933 | Gotthardt | 236—99 |
| 2,221,347 | 12/1940 | Giesler | 236—98 X |
| 2,447,560 | 8/1948 | Branson | 236—99 X |
| 2,557,035 | 6/1951 | Lichty | 236—99 X |
| 2,815,035 | 12/1957 | Eskin et al. | |
| 2,925,986 | 2/1960 | Woods | 236—99 X |

ALDEN D. STEWART, *Primary Examiner.*